MOBILE EXCAVATORS

Original Filed Dec. 9, 1958 2 Sheets-Sheet 1

MOBILE EXCAVATORS

Original Filed Dec. 9, 1958 2 Sheets-Sheet 2

United States Patent Office

Re. 25,495
Reissued Dec. 17, 1963

25,495

MOBILE EXCAVATORS

Ingebret Söyland and Kristian Söyland, both of Bryne, near Stavanger, Norway

Original No. 2,995,261, dated Aug. 8, 1961, Ser. No. 779,219, Dec. 9, 1958. Application for reissue Aug. 1, 1963, Ser. No. 300,134
3 Claims. (Cl. 214—138)

Matter enclosed in heavy brackets [ ] appears in the original patent but forms no part of this reissue specification; matter printed in italics indicates the additions made by reissue.

This invention relates to mobile excavators of the type comprising a wheeled chassis, a rotatable platform supported on the chassis, a boom or jib arm pivoted at one end to the platform and at the other end to a shovel arm, a shovel pivotally connected to the shovel arm and hydraulic power means for operating the digging device.

When an excavator of the type above referred to is operated in soft, muddy soil the wheels tend to sink and spin when driven from the prime mover so that the excavator cannot be used.

It is therefore a principal object of the present invention to provide an improved excavator which can be moved on its working site even if the wheels sink deep into mud.

Another object of the invention is the provision of an effective excavator, which is light, simple in construction and inexpensive to produce or manufacture.

Figure 1:
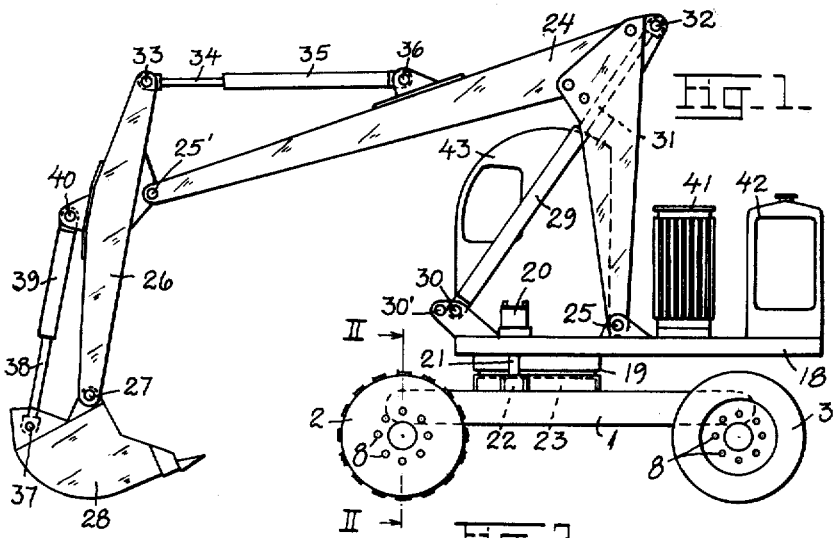

In order that the invention itself, as to its objects and advantages and mode of operation, may be better understood reference is made to the following description taken in connection with the accompanying drawings forming a part thereof, in which:

FIGURE 1 is a side elevation view of a mobile excavator according to the invention.

Figure 2:
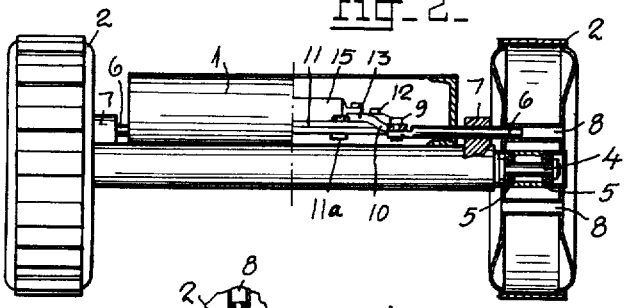
Figure 3:
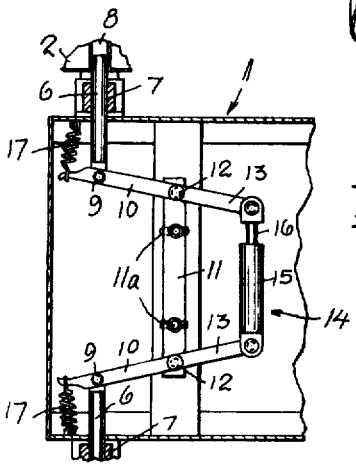
Figure 4:
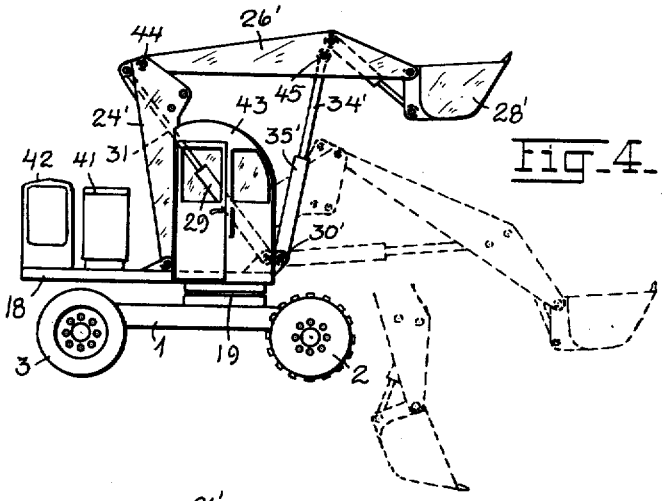
Figure 5:
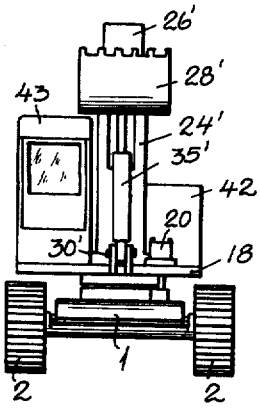
Figure 6:
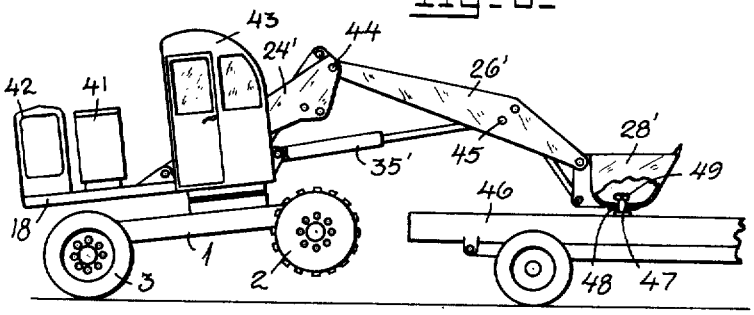

FIGURE 2 is a front end view of the chassis, partly in section taken along the line II—II in FIG. 1, FIGURE 3 is a fragmentary top plan view, with parts broken away, showing the operating mechanism of the locking means for the wheels, FIGURE 4 is a side elevation view of a modified embodiment of the excavator according to the invention, FIGURE 5 is a front end view of the embodiment shown in FIG. 4, and FIGURE 6 is a side elevation view of the excavator transported by means of a lorry.

According to the invention a wheeled shovel excavator is provided having all wheels mounted free on axles, the prime mover being eliminated so that movement of the excavator on a site can be effected by using the shovel arm.

The movement of the excavator is effected by using the shovel arm with shovel which is pressed down on the ground until the front wheels are lifted clear of the ground so that the excavator chassis only rests on its rear wheels and the shovel. Resting thus on the two rear wheels the excavator can be pulled forwards or pushed backwards or turned sideways to either side by manipulation of the usual hydraulic means.

This tilting and movement of the excavator are made possible by eliminating any direct drive from an engine to the wheels, as otherwise the gears would be broken or harmed by operation of the excavator in accordance with the invention.

Experiments have shown that the excavator according to the invention can be moved fast and steadily on such sites where an ordinary power driven excavator was helpless, and that it is serviceable under all conditions no matter how soft and muddy the ground is.

By eliminating an engine for propulsion the construction of the chassis of the excavator will be simpler as well as cheaper to produce.

In order to prevent movement of the excavator during digging operation means are provided for releasably locking the wheels against rotation relative the chassis frame.

Referring to FIGS. 1, 2 and 3, in which are shown a complete view of a first embodiment of an excavator according to the invention and a front wheel locking mechanism and a detailed plan view of the locking mechanism respectively, the excavator comprises a chassis frame 1 which is movable on two pairs of wheels, front wheels 2 and a pair of rear wheels 3, respectively. The front wheels are preferably of the drum type, while the rear wheels 3 may be of the common type having pneumatic tires.

Each and all of the wheels 2 and 3 are freely mounted on the respective axles 4 preferably by means of ball bearings 5 as illustrated in FIG. 2.

In order to prevent moving of the excavator chassis during digging operation one or both pairs of said wheels are lockable relative the frame 1.

To this end locking bolts 6, one for each of the wheels 2, are mounted axially slideable in the frame 1 by means of bearings 7 and extend into said frame. The outer ends of the bolts 6 are adapted to co-operate with holes 8 in the adjacent wheel 2. The holes are evenly spaced in a circular row the radius of which corresponds to the distances between the axes of the wheel and the bolt 6, so that when the wheel is rotating one of the holes 8 coincides with the bolt which may be inserted into a hole to lock the wheel.

At the inner end of each of the locking bolts 6 is pivotally connected at 9 an arm 10 of a two-armed lever pivotally secured to the adjacent end of a cross-member 11 by means of a pivot 12. The cross-member is secured to the frame 1 by means of slit and tongue joints 11*a* to permit limited movement of the cross-member 11 at right angles to the axis of the bolts 6.

Between the free end of each of the arms 10 and the adjacent side portion of the frame 1 is secured a traction spring 17 serving to force the bolt outwardly into engagement with the holes 8 of the adjacent wheel 2.

In order to retract the bolts 6 simultaneously from a locking position against the action of the springs 17, the other arms 13 of said two-armed levers are interconnected by a hydraulic motor 14 consisting of a cylinder 15 whose top end is pivotally connected to one of said arms and whose piston rod 16, extending from the bottom end of the cylinder is pivotally connected to the other of said arms 13.

When the hydraulic motor 14 is actuated to release the locking mechanism, the two-armed levers are moved to carry the bolts 6 inwardly into inoperative position in which they may be locked by locking the hydraulic fluid in the motor 14.

Similar locking means, operating in the same manner, are preferably provided also in connection with the rear wheels 3.

A platform 18 is supported as a turntable on the chassis frame 1 by means of a bearing 19 and the rotation of said platform 18 is effected by means of a reversible hydraulic motor 20 of known type the shaft 21 of which is provided with a pinion 22 meshing with a toothed wheel rim 23 secured to the chassis frame 1.

A rigid angle-shaped jib arm 24 is pivoted at one end at the point 25 to the platform 18 so that the arm 24 may swing in a vertical plane. The other end of the jib arm 24 is pivotally connected at the point 25' to a shovel arm 26 carrying pivotally at 27 a shovel 28.

A double-acting hydraulic cylinder 29 is pivoted to the platform 18 at the front end thereof at 30 and the associated piston rod 31 is pivoted to the jib arm 24 at the point 32. The upper end of the shovel arm 26 is pivotally connected at 33 to the rod 34 of a piston slideable in a double-acting cylinder 35 which in turn is pivoted at 36 to the jib arm 32. The rear part of the shovel 28 is pivotally connected at 37 to the piston rod 38 of a double-acting cylinder 39 which in turn being pivoted at 40 to the shovel arm 26.

The hydraulic fluid is supplied to the respective hydraulic motors through connecting pipes (not shown) from a fluid tank 41 supported on the platform 18 in usual manner by means of an engine and pump aggregate 42 also supported on the platform 18. Suitable hydraulic control means, preferably arranged in a driver's cab 43, are inserted in said connecting pipes, which control means may be valves of usual and well-known commercial construction and are therefore not shown or described in detail.

If the excavator according to the invention is to be moved forwards or backwards on the site the operator actuates the hydraulic controls to cause the motors 14 to drive their respective rods axially outwardly so as to release all locking bolts 6 and to lock the fluid in said motors thus forming a rigid structure between the arms 13. Thereafter the shovel arm 26 is pressed down until the chassis only rests on its two rear wheels 3. By turning the shovel arm 26 inwards or outwards by means of the hydraulic cylinder 35, the excavator can now be pulled forwards or pushed backwards respectively. Further the excavator can be turned sideways by using the hydraulic motor 20 by which the chassis may be turned to the desired angle in a horizontal plane. In extremely soft ground the excavator can be tilted forwards and backwards in this manner by moving the shovel. If the shovel arm 26 and jib arm 24 are placed at a right angle to the longer axis of the chassis, the excavator will be lifted up on one front wheel 2 and one rear wheel 3.

Although the embodiment above described, in which the hydraulic cylinder 29 of the jib arm 24 is connected to the platform 18, while the hydraulic cylinder 35 of the shovel arm 26 is connected to the jib arm 24, gives excellent service, the two cylinders are unevenly loaded and the whole load is transferred to the platform 18 through the cylinder 29 of the jib arm 24.

In order to obtain an even distribution of the load through both cylinders these may be arranged as shown in the embodiment according to FIGS. 4 and 5.

The general construction of the excavator is similar to that of FIGS. 1 to 3, and the like parts are indicated by similar reference numerals.

In this modification the shovel arm 26' is pivoted at the point 44 to the upper end of a straight jib arm 24' which is operated by a hydraulic cylinder 29, 31 as in FIG. 1. The double-acting cylinder 35', operating the shovel arm 26', is pivoted to the platform 18 at the point 30' positioned close to the point 30 at which the cylinder 29 is pivoted. If so desired both cylinders 29 and 35', may be pivoted at the same point, such as the point 30.

When the cylinders are arranged as above described, the load is transferred to the platform 18 through both of them, and by combining the effects of the cylinders 29 and 35' in selected combinations, the shovel may be caused to travel in various paths as required by the program of the digging operation, at the same time as the shovel arm 26' may be moved horizontally.

The transport of the excavator from one site to another, such as along main roads, takes place by towing with a lorry as illustrated in FIG. 6.

To this end the shovel 28' is supported on the lorry platform 46 and the [shovel] *shovel* arm 26' is pressed down until the chassis only rests on its two rear wheels 3 and on said shovel 28'. In order to allow rotation but prevent sliding of the shovel relative the platform 46, a bolt 47 secured to the platform extends upwardly through a hole 48 formed in the bottom of the shovel 28' and is provided with a head shaped nut 49. In this manner the excavator is towed as a trailer.

As it will be understood various substitutions and changes in the form and details of the machine described and illustrated and its operation may be made by those skilled in the art without departing from the spirit of the invention.

We claim:

1. A mechanical shovel comprising, in combination, a chassis frame, pairs of freely rotatable front and rear wheels supporting the frame above the level of the axis of rotation of the wheels, a rotatably driven shovel-supporting platform pivotally mounted for rotation on said frame about a vertical axis, driven means pivotally mounting the platform on said frame without extending downwardly of the frame thereby to keep the chassis free of all obstructions and movable parts below the underside of the frame, wheel-locking means operable at will mounted above a plane passing through the axis of rotation of the wheels to releasably lock at least one pair of wheels to preclude rotation of at least one pair of wheels, each of the wheels to be locked having annularly arranged apertures disposed concentric with the axis of rotation of the respective wheel and radially thereof, said wheel-locking means comprising a pair of reciprocable elongated pins each drivable in opposite directions transversely of the frame for engaging a respective wheel through one of said apertures alined with a respective pin, and means operable at will to reciprocably drive the pins into and out of engagement with a respective wheel, a jib arm [having a first portion] pivotally mounted on the platform and movable in a vertical plane between a lowered position and an upstanding position [and a second portion forming a boom portion connected at an angle to an end of the first portion opposite to an end thereof connected to the platform], a shovel arm [having opposite ends and] pivotally connected to a free end of said [boom portion] *jib arm*, a shovel bucket pivotally connected to one end of the shovel arm and to the [boom portion] *jib arm* for actuating the bucket, and a second double acting mechanism pivotally connected to the platform and [intermediate opposite ends of the boom portion of] the jib arm for raising and lowering said jib arm.

2. A mechanical shovel comprising, in combination, a chassis frame, pairs of freely rotatable front and rear wheels supporting the frame above the level of the axis of rotation of the wheels, a rotatably driven shovel-supporting platform substantially the length of the frame pivotally mounted for rotation on said frame about a vertical axis, driven means pivotally mounting the platform on said frame without extending downwardly of the frame thereby to keep the chassis free of all obstructions and movable parts below the underside of the frame, wheel-locking means operable at will mounted above a plane passing through the axis of rotation of the wheels to releasably lock at least one pair of wheels to preclude rotation of at least said one pair of wheels, each of the wheels to be locked having annularly arranged apertures disposed concentric with the axis of rotation of the respective wheels and radially thereof, said wheel locking means comprising a pair of reciprocable elongated pins each drivable in opposite directions transversely of the frame for engaging a respective wheel through one of said apertures aligned with a respective pin, and means operable at will to reciprocably drive the pins into and out of engagement with a respective wheel, said means to drive the pins comprising, for each pin a pivotally mounted lever connected to the pin, for each pin a spring constantly urging a respective one of the last-mentioned levers into an operative position for engaging the respective pin in an aperture of its respective wheel, and a mechanism operable at will connected to the levers for moving said levers respectively in directions effective to cause the pins to be withdrawn from apertures in the wheels and to remain in this position until it is desired to lock the wheels, a jib arm having a first portion pivotally mounted on the platform and movable in a vertical plane between a lowered position and an upstanding position and a second portion forming a boom portion connected at an angle to an end of the first portion opposite to an end thereof pivotally connected to the platform, a shovel arm having opposite ends and pivotally connected intermediate its opposite ends to a free end of said boom portion, a shovel bucket pivotally connected to one end of the shovel arm, a double acting mechanism connected to the shovel arm and to the boom portion for actuating the bucket, and a second double acting mechanism pivotally connected to the platform and intermediate opposite ends of the boom portion of the jib arm for raising and lowering said jib arm.

3. In a mobile shovel excavator the combination of a chassis frame, two pairs of wheels freely mounted on front and rear axles, respectively, on said frame, means for releasably locking at least one of said pairs of wheels relative said frame, a rotatable platform supported on said chassis frame, a jib arm supported on said platform, a shovel arm pivotally connected to the free end of said jib arm, a shovel pivoted to the end of said shovel arm and hydraulic power means for operating said platform, jib arm, shovel arm and shovel, and said shovel having a hole to receive a pivot for towing from the platform of a lorry.

References Cited in the file of this patent or the original patent

UNITED STATES PATENTS

| | | |
|---|---|---|
| 830,107 | Sluder | Sept. 7, 1906 |
| 2,781,927 | Holopainen | Feb. 19, 1957 |
| 2,852,149 | Bruneri | Sept. 16, 1958 |

FOREIGN PATENTS

| | | |
|---|---|---|
| 22,692 | Great Britain | Oct. 5, 1912 |
| 152,711 | Sweden | Sept. 29, 1955 |
| 774,162 | Great Britain | May 8, 1957 |
| 1,046,255 | France | July 8, 1953 |